United States Patent [19]

Bolcavage et al.

[11] 4,275,653
[45] Jun. 30, 1981

[54] LINE PRINTER SYSTEM AND METHOD OF OPERATION WITH MICROPROCESSOR CONTROL

[75] Inventors: Richard D. Bolcavage, Kirkwood, N.Y.; Arthur E. Fleek, Cary, N.C.; Mitchell P. Marcus, Boca Raton, Fla.

[73] Assignee: International Business Machines Corporation, Armonk, N.Y.

[21] Appl. No.: 115,855

[22] Filed: Jan. 28, 1980

[51] Int. Cl.³ .............................................. B41J 1/20
[52] U.S. Cl. ............................ 101/93.14; 101/93.29; 400/155; 364/900
[58] Field of Search ............... 101/93.14, 93.29, 93.09, 101/111; 400/582, 61, 583, 155, 616-616.3; 364/111, 116, 518, 519

[56] References Cited

U.S. PATENT DOCUMENTS

| 2,993,437 | 7/1961 | Demer et al. | 101/93 |
|---|---|---|---|
| 3,303,776 | 2/1967 | Rausch | 101/93 |
| 3,629,848 | 12/1971 | Gibson et al. | 340/172.5 |
| 3,742,845 | 7/1973 | Giani | 101/93 |
| 3,777,128 | 12/1973 | Kirkham | 364/111 X |
| 3,845,710 | 11/1974 | Brodrue | 101/93.14 |
| 3,952,648 | 4/1976 | Sery et al. | 101/93.14 |
| 4,019,100 | 4/1977 | Barrus | 101/93.29 X |
| 4,122,769 | 10/1978 | Sery et al. | 101/93.14 |
| 4,218,754 | 8/1980 | Schaeffer | 364/900 |

OTHER PUBLICATIONS

Brundaze, IBM Tech. Discl. Bulletin, vol. 21, No. 3, Aug. 1978, pp. 972-975.
Hays et al., IBM Tech. Discl. Bulletin, vol. 22, No. 1, Jun. 1979, pp. 269-271.

Primary Examiner—Edward M. Coven
Attorney, Agent, or Firm—John S. Gasper

[57] ABSTRACT

A printer system comprising a belt printer mechanism controlled by a stored program digital microprocessor to print lines of data on a print medium. Selective operation of a linear array of print hammers, paper feeding, data conversion and arranging in scan/subscan order are performed by the microprocessor. The fire data for operating hammers is precalculated and arranged in scan/subscan order during the print medium feeding interval with printing occurring immediately at the first print scan after print medium motion in which one or more desired characters become aligned with print hammers. An indirect addressing technique which eliminates sorting is used to arrange the print position fire data in scan/subscan order.

20 Claims, 6 Drawing Figures

| HAMMER | 1 | 2 | 3 | 4 | 5 | | 65 | 66 |
|---|---|---|---|---|---|---|---|---|
| PRINT POSITION PP | 1 2 | 3 4 | 5 6 | 7 8 | 9 10 | | 129 130 | 131 132 |
| SUBSCAN SS FIRED | 1 4 | 2 5 | 3 1 | 4 2 | 5 3 | | 5 3 | 1 4 |
| ADJUST A | 0 1 | 1 2 | 2 2 | 3 3 | 4 4 | | 52 52 | 53 53 |
| HAMMER SETTLE TIME H1 | 4 | 4 | 5 | 5 | 5 | | 5 | 4 |
| H2 | 6 | 6 | 5 | 5 | 5 | | 5 | 6 |

LINE PRINTER SYSTEM AND METHOD OF OPERATION WITH MICROPROCESSOR CONTROL

DESCRIPTION

1. Technical Field

This invention relates to on-the-fly line printers and particularly to a line printer system and its method of operation. While not necessarily limited thereto, the printer system has special application as a subsystem for attachment to a data processing system or network.

Line printers are well known in which the print element is a band, belt, chain, train or the like which contains a variety of uniformly spaced characters arranged in linear sequence. The characters may be arranged in one or more sets and certain more commonly used characters may have various multiple occurrences. The print element moves continuously across the print line presenting in some given interval a complete character set to each print position. A print unit comprising a row of uniformly spaced print members is arranged in parallel with the type element. Controls selectively operate the print members to record characters at random on a record medium as known characters are aligned with desired print positions of the print line. When the data of a print line is complete, the record medium is advanced one or more line increments to the next print line position where the next line of data is printed and so on.

It is a common feature of band type printers that the characters on the type element have a pitch which differs from the pitch of the print members. Consequently, band motion causes subgroups or subsets of characters to align with subgroups of print positions in a series of printing sequences in accordance with the well known scan/subscan principle of operation.

A print scan is the time interval between alignment of successive band characters at a print position. A subscan is the time interval in which one subgroup or subset of characters align at one subgroup of print positions. The number of subscans per print scan is dependent on the relationship of the type element pitch and the print member pitch. A typical pitch relationship provides for each subscan to have every third character align with every fifth print position. In that case a scan period equals five subscans during which all print positions have been given an option to print one character.

Line printers of this type have wide application as output printers in data processing systems. In such applications it is common to have interchangeability of type elements whereby various sets or groupings of type characters are obtainable. It is also possible for the print output rate of the printer to be increased by substituting one type set for another. The control arrangement used in the past has made type set substitution relatively difficult sometimes requiring redesign of the printer controls. While allowing type set substitution, in some instances other control arrangements have been relatively complex and have required substantial processing time in controlling the operation of the printer. Demands for processor time are generally higher where printing occurs by using real time comparison between code generators representing characters of the type element and print characters in a storage device, or representing character order number/print member coincidences and characters arranged in subscan sequence. In the latter instance, special processing and sorting techniques were required to obtain data conversion with proper arrangement of the print data. Also the comparison of coincidences and sorted data required some fixed starting point for printing to occur which thereby further reduces the print output rate.

2. Background Art

U.S. Pat. No. 2,993,437 issued July 25, 1961 to F. Demer, et al discloses a control arrangement for a chain printer in which character counters are operated by timing means operatively connected to the chain to generate character signals representing character print position alignments as the characters advance along the print line. The characters are compared with characters read from a storage unit in the same print position sequences on a real time basis with chain motion and hammers ultimately operated on the basis of the comparison match.

In U.S. Pat. No. 3,303,776 issued Feb. 14, 1967 to F. Rausch, the control arrangement replaces the character counters with a core storage unit in which an image of all characters are stored as they occur on the chain. Read out from chain image storage unit and print line data storage is performed for comparison on a real-time basis with the motion of the chain.

In U.S. Pat. No. 3,629,848 issued Dec. 21, 1971 to R. G. Gibson, et al, the image of the chain and the print line data are both stored in main memory of a central processing unit. Using a cycle steal technique and adapter with a character address counter and a pair of registers, chain image characters and data from the areas of main memory are read out and compared on a real-time basis with the motion of the type chain and hammers are optioned where the comparisons match.

In U.S. Pat. No. 3,845,710 issued Nov. 5, 1974 to D. A. Brodrueck, the control arrangement for a belt printer comprises dual storage memory in which two print lines of data are stored and read out sequentially for comparison with signals from a type character font generator. The control arrangement allows storing one print line while the other is being printed. Read out, character generation, and comparison are performed on a real-time basis.

In the belt printer control arrangement of U.S. Pat. No. 3,742,845 issued July 3, 1973 to A. Giani, print line data is converted from character code to a combination order number and "correct" code representing the type aligned with the first print position and types aligned with print positions other than the first positions. Print data is processed in the subset sequence in which alignments occur and stored in subset sequence in a buffer. During printing a counter operated real-time by pulses from the belt generates order numbers for comparison with every "correct" code for every buffer storage positions for every print scan interval. Information bits from a processor are stored in buffer storage having characters which occur at greater frequency in a type set. Comparison on read out from the buffer includes information bits to prevent the printing of the more frequently occurring characters more than once per print position in a line of data.

In the control arrangement for a belt printer described in U.S. Pat. No. 3,952,648 issued Apr. 27, 1976 to J. Sery, et al, print line data is converted from character/print position code in successive steps to belt order rank/print position code and then to print position/scan number. This converted data is sorted and stored in an output memory in subscan order. A comparison unit operating real-time during printing controls print unit operation each time an identity occurs between data in the output memory and data from a detection unit which generates code in the sequence in which character/print number coincidences occur.

U.S. Pat. No. 4,122,769 issued Oct. 31, 1978 to J. Sery, et al discloses a modification of the control arrangement of U.S. Pat. No. 3,952,648 which uses a table containing information relative to the re-occurrence in a type series or otherwise of characters to be struck. An auxiliary comparator makes a second comparison following a negative first comparison with a second table having information relating to distances between positions at which a repeated character is to be found. The comparisons occur real time with motion of the belt.

The IBM TDB article of D. E. Brundage published August 1978 Vol. 21, No. 3 at pp 972-975 discloses a microprocessor control for a wheel printer. Printable characters in a line or column are pre-arranged by the processor in the same order as the characters on the print mechanism. Character pre-arrangement, done during document motion, first involves converting the characters to wheel code and storing in a buffer. The characters are then sorted by a process of buffer ordering where characters are arranged in ascending order. Upon completion of the sorting operation, the processor awaits document stop then checks wheel emitter counter and sets a pointer to the buffer position where printing is to start. As each character is progressively read from the buffer, it is compared with the wheel emitter counter and a hammer byte stored to fire on the next emitter time.

DISCLOSURE OF THE INVENTION

In accordance with the present invention, a control arrangement for a line printer has been provided in which real time code comparisons are unnecessary and printing can be initiated immediately upon cessation of print medium motion. Print line data is pre-arranged during print medium feeding into a scan/subscan table and from which a print position fire table is prepared whereby the print operating begins with the first available scan/subscan at which printing can occur and continues in scan/subscan order until all characters in the line of data have been printed. The scan/subscan order of print line characters is obtained using an occurrence table which contains data relating to the number of occurrences of the different characters on the belt in combination with position data specified in terms of the number of scans each character occurrence is displaced relative to a reference belt position. The belt occurrence table is developed from an image of the belt stored in a memory device. A stored program microprocessor uses the belt image to build the occurrence table. Since type position data is stated in scans, type belts are readily substituted without regard to variations in characters from the different belts. The type character arrangement and the typeset arrangement becomes unecessary although appropriate for many applications.

An indirect addressing scheme is provided which eliminates time-consuming data sorting. Essentially, indirect addressing is obtained by building a print position fire table in which all the print positions that are to be fired are arranged for each subscan.

BEST MODE FOR CARRYING OUT THE INVENTION

Figure 1:
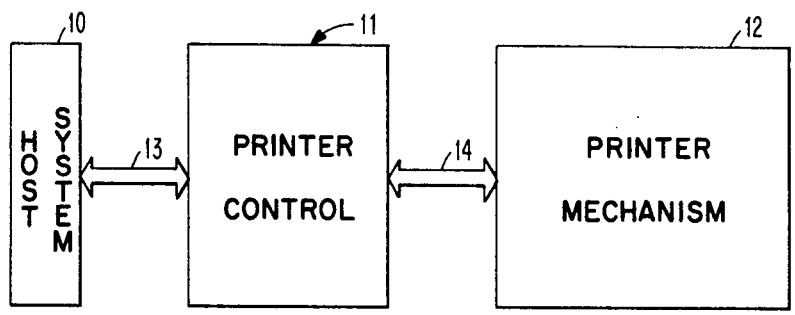
FIG. 1 is a diagram of a representative printer system.

FIG. 1 is a generalized version of a representative printer system comprising a host system 10 and a printer subsystem comprising printer controls 11 and a printer mechanism 12. Command and data signals are provided in a well-known manner by the host system 10 on bus 13 to printer control 11. Command and control signals are also provided by printer control 11 on bus 14 to the printer mechanism 12. Busses 13 and 14 can be bi-directional so that status and other signals can be supplied from printer control 11 and printer mechanism 12 to host system 10. Typically the host system 10 generates information including command and data and monitors status. Printer control 11 receives the command from data, decodes the commands, checks for errors and generates status information as well as controls printing and the operation or advance of the print medium.

Figure 3:
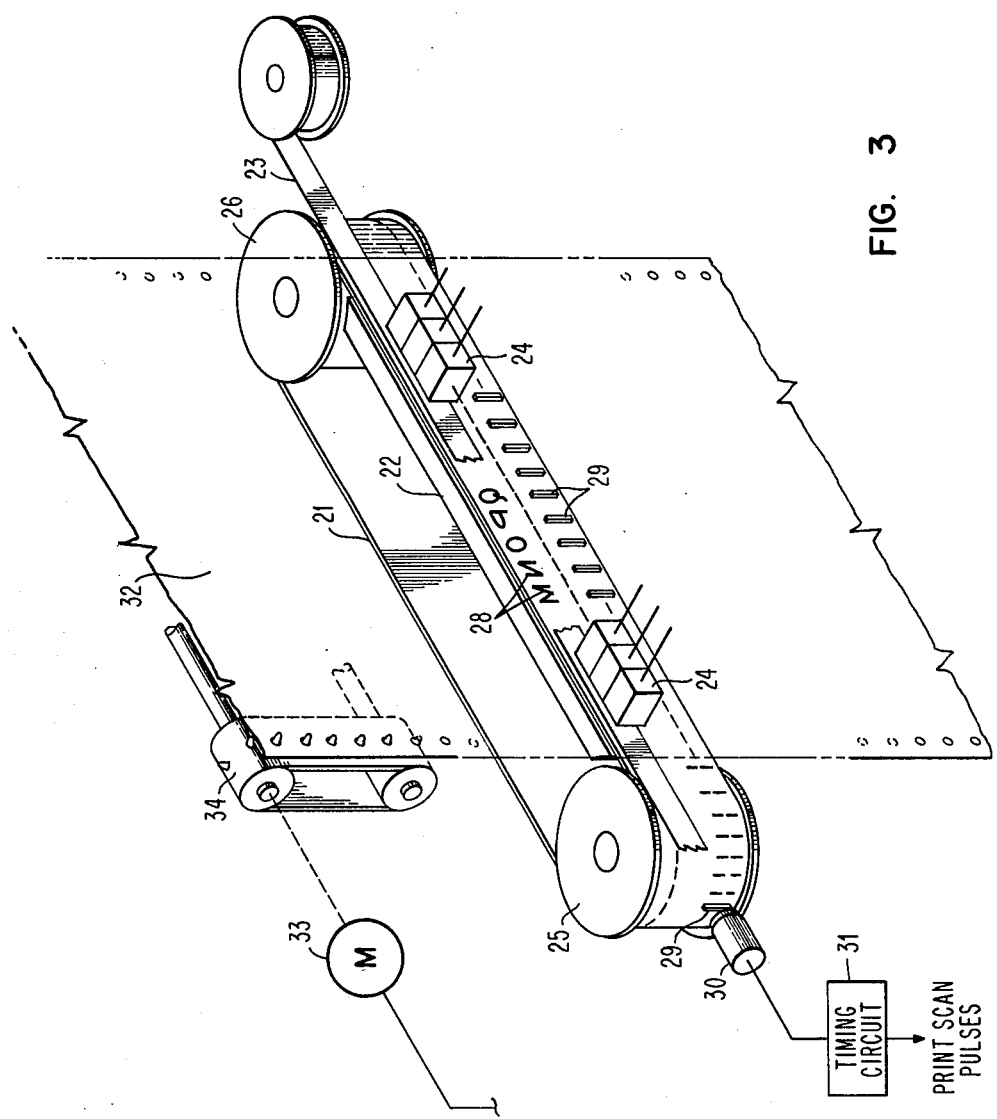
FIG. 3 shows a printer mechanism usable in the printer system of FIG. 1.
Figures 4, 6:
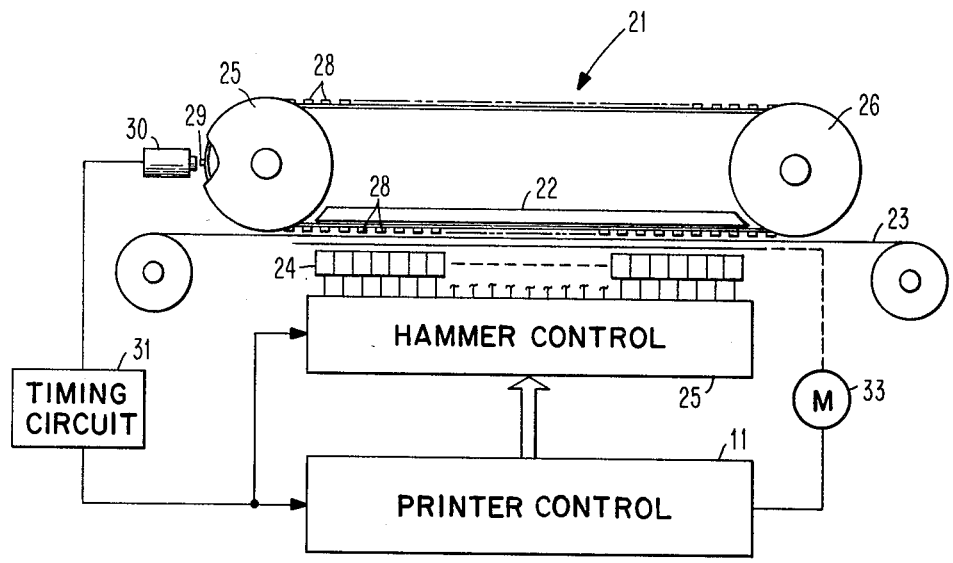
FIG. 4 shows portions of the printer mechanism of FIG. 3 in combination with the printer control.
FIG. 6 is a table showing adjust and correction values for a two-wide print unit.

The printer mechanism 12 as shown in FIGS. 3 and 4 comprises a continuous type belt 21, platen 22, ink ribbon 23 and electromagnetically operated print hammers 24 arranged in a row parallel with the straight portion of type belt 21. Type belt 21 is supported by a pair of drive pulleys 25 and 26. A motor (not shown) is connected to either pulley 25 or 26 and operates to move the type belt 21 at a constant speed throughout the printing operation. Engraved characters 28 are formed entirely around the type belt and are uniformly spaced. Belt 21 has timing marks 29 which are sensed by transducer 30 which with timing circuit 31 generates print scan pulses. Customarily the engraved characters 28 are varied and certain characters will occur more frequently than others. Characters 28 may be arranged in several identical sets or may be completely random as to their distribution. The arrangement and distribution is a matter of choice dependent entirely on needs of a particular data processing printer application. For changing type sets, either as to number of characters, their frequency of occurrence and/or arrangement, type belt 21 is removable from pulleys 25 and 26. Alternatively type belt 21 and pulleys 25 and 26 can be made part of a cartridge assembly which is replaceable as a unit.

Print hammers 24 are arranged facing the engraved characters 28. Print hammers 24 are uniformly spaced over the distance which represents the length of the print line. The number of print hammers depends on the number of print positions desired in the span of the individual hammer. For example, there can be a print hammer for each print position or the print hammer may have a span of two or more print positions. In any event, in practicing this invention the pitch of the characters is different from the pitch of the print hammers, i.e. the print positions. Consequently, during the revolution of type belt 21 subgroups of characters 28 align with subgroups of different print hammers 24 across the row in scan/subscan sequences. A scan is defined as the time separating two alignments of a character with a particular print position. The subscan is defined as the time separating the successive subgroups of alignment of characters appearing in the course of a scan. The number of subscans is dependent on the ratio of the character pitch and the print hammer pitch. In a particular arrangement the print mechanism would have 132 print positions at 0.1" pitch. There are 66 print hammers 24 each spanning two print positions. The type belt 21 has 192 character positions utilizing a preferred character set where certain characters occur more frequently than others at a pitch of 0.25". A complete revolution of the belt is broken down timewise into 192 scans. The belt position B that is aligned with print position $PP_1$ defines the scan S. In other words, for print position $PP_1 S=B$. For this particular pitch a scan is divided into five subscan periods. Belt movement is 0.05" for subscan. Each print position has a belt position aligned with it only on a particular subscan. On each subscan twenty-six or twenty-seven (approximately one-fifth) print positions have belt positions aligned with them. For each print position $PP_X$ there is defined an adjust value $A_X$ such that the scan on which any belt position aligns with the print positions $PP_X$ is given by the expression $S=B-A_X$. Printing is accomplished by the print hammers 24 when energized by hammer control 25 as determined by the printer control 11 selectively impacting a print medium 32 against the inked ribbon 23 and characters 28 of type belt 21 on selected subscans of the print scans when the desired characters 28 on belt 21 are in the correct position as determined by printer control 11. When all the print hammers 24 have been operated to record the desired characters forming a line of data a signal from printer control 11 on channel 14 activates motor 33 and pin feed device 34 to index print medium 32 one or more increments to a new line position for printing the characters of the next line of data.

Figure 2:
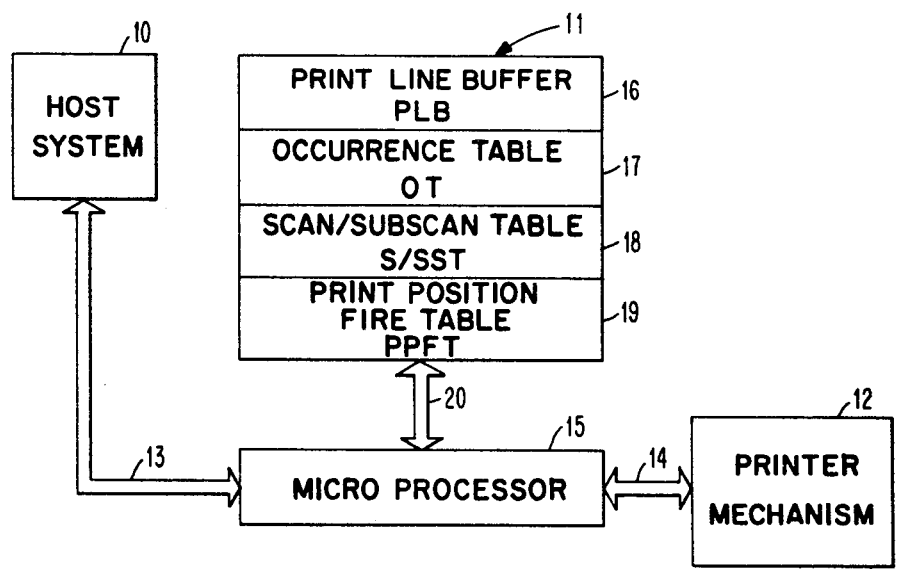
FIG. 2 is a drawing of the printer system of FIG. 1 showing additional details of the printer controls.

Printer control 11, as shown in FIG. 2, comprises a stored program microprocessor 15, print line buffer PLB 16, occurrence table OT 17, scan/subscan table S/SST 18, and print position five table PPFT 19 which may all be distinct storage areas of a single RAM memory device. Channel 20 affords the required access by microprocessor 15 to the buffer and tables.

PLB 16 provides storage for one or more lines of data consisting of character code and print position code in individually addressable storage locations. The number of buffer storage locations is at least equal to the number of print line positions, e.g. 132. The character code and position code for the line of data to be printed is supplied to PLB 16 by the host system 10 via channel 13 either directly or through operation of microprocessor 15 through channel 20.

OT 17 stores an occurrence table for each distinct or unique character on type belt 21. Each character table contains the distinct character code along with a numerical value specifying the number of occurrences of that character for the entire type belt. Associated with each character table in OT 17 is belt position code representing the belt positions for each occurrence of the table character. For example, a character having five occurrences on the type belt would have a storage location for the character code, another storage location for the numerical value five, and five storage locations for belt position codes representing the five belt positions of that character on the type belt. The belt position code specifies the number of print scans each character is displaced relative to a reference or home position on the type element. The home position for this purpose could correspond with the home pulse position of the timing marks 29 on type belt 21 as shown in FIG. 1. In that position, the reference character aligns with the first print position $PP_1$, and its belt position would be zero scans. The last character on the belt, for example, the 192nd character would have a belt position of 192 scans. The occurrence table data corresponds to the typeset of the type belt. As type belts are interchanged, new occurrence tables are built and stored in OT 17. The occurrence table data may be organized by the host system 10 and supplied through microprocessor 15. Alternatively, an image of the type belt may be provided to the microprocessor 15 for the development of the occurrence table and storage in OT 17.

In accordance with this invention, each print position for the next line is examined for each character to be printed and the earliest scan/subscan period of alignment after indexing is determined. The time allowed for indexing print medium 32 is first translated into scans to specify the scan at which the next line in PCB 16 is to be printed. This scan is called Scan Start ($S_I$). The Scan Start $S_I$ signal may be supplied by the host system through microprocessor 15 along with the character data signals or it can be a fixed value stored in a microprocessor register based on the time interval for indexing print medium 32 one print line space. During indexing each print position in PLB 16 is examined in turn for each character to be printed. The earliest belt position occurrence for that character at or after $S_I$ is determined from scan table OT 17. Microprocessor 15 then calculates the scan during which that belt position will align with the designated print position. The calculated scan value is the corresponding scan/subscan address in S/SST 18 where an indirect address IA is assigned and stored which points to an indirect address IA location in print position fire table PPFT 19 at which the print position fire information is stored. For each additional print position in which a particular character aligns in the same calculated scan, the print position value is stored in the same indirect address location. A count CT of the number of print positions to be fired in a print subscan is also stored at the indirect address location of PPFT 19. Each time an IA location is addressed to store a print position to be fired in the related subscan address of S/ST 18, the count CT is checked with a maximum count, e.g. 6. If the count CT in storage equals the maximum count, microprocessor 15 recycles the process by determining the next higher belt position after $S_I$ and recalculates a new scan with an IA having a CT below maximum. When all characters in PLB 16 have been so processed, microprocessor 15 monitors scan pulses from timing circuit 31 in FIG. 3 to determine when $S_I$ occurs. Printing is commenced at $S_I$ beginning with the addressing the S/SST 18 at the scan address corresponding to the numerical value of $S_I$ supplied earlier. Thereafter the tables of S/SST 18 are addressed in ascending sequence, the IA's read from the subscan tables where present, and the corresponding IA's of PPFT addressed to determine the print hammers 24 to be fired by the printer control 11 and the hammer control 25 as shown in FIG. 4.

Figure 5:
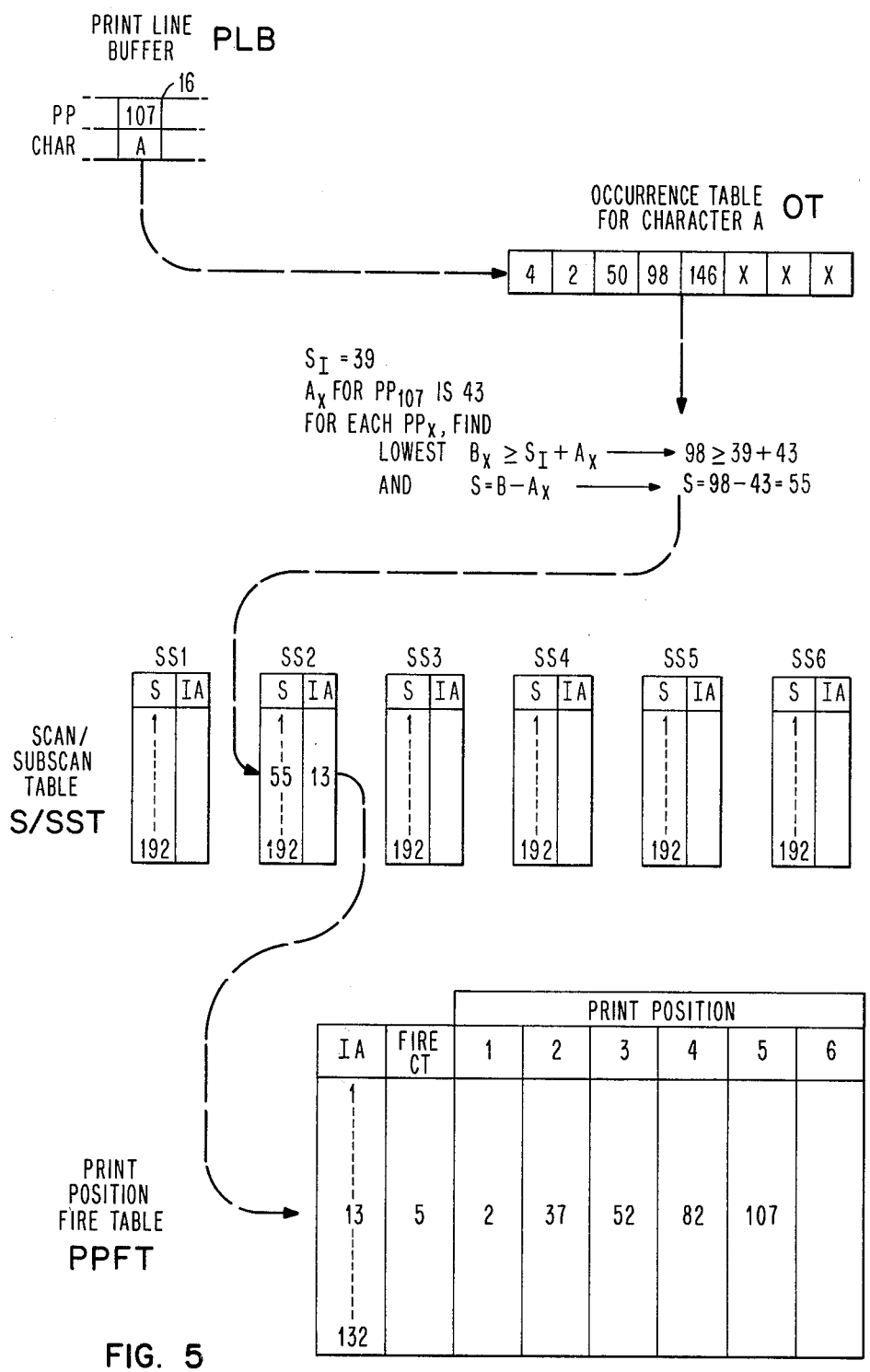
FIG. 5 is a flow diagram illustrating the operation of part of the printer controls of FIG. 1.

FIG. 5 is a flow diagram explaining the procedure for processing a single character. Character A in PP 107 of PLB 16 is examined by microprocessor 15 during indexing. The adjust value, $A_X$ (in scans) for print position 107 is determined from a table of adjust values stored in a microprocessor ROS. The table in FIG. 6 shows the adjust values for the various print positions. Microprocessor 15 performs the calculation $B \geq S_I + A_X$ which for PP 107 equals 82. From occurence table A of OT 17, there are four occurrences of character A indicated at belt positions 2, 50, 98, and 146. The belt position $B_X$ which satisfies the equation is the third occurrence in OT 17 which is 98. Microprocessor 15 then determines the scan in which belt position 98 aligns with PP 107 by processing the expression $S = B - A_X$ which for this specific example equals 55. Next, S/SST 18 is addressed at the scan address 55 and an indirect address IA is determined. If no IA exists, one is assigned. IA's are assigned sequentially as needed. When a location in S/SST 18 is addressed for the first time, the next sequential IA is assigned. In FIG. 5, scan location 55 of SS 2 has an IA of 13. This IA points to address 13 of PPFT 19 where the count CT shows four print positions already in the fire table. Since CT equals four, the maximum of six is not equalled. Print position 107 is entered into table position PP5 of PPFT 19 and CT is increased to five.

When all characters in PLB 16 have been processed and printing starts when print medium motion has stopped, S/SST 18 is addressed at scan position equal to $S_I = 39$. The IA for each subscan beginning with $S_I = 39$ is determined and the print positions read from the PPFT 19 and applied to hammer control 25. Microprocessor 15, synchronized by print scan pulses from transducer 30, addresses all scan locations in succession in ascending order until all print positions in PPFT 19 have been read out and the corresponding hammers 24 fired. When this occurs, print medium 32 is indexed, and the process of building a scan/subscan table and a print position fire table for the next line of data is repeated with printing begun at a new Start Scan SI with scan/subscan table addressing beginning at the new address position of $S_I$.

In some printers the print hammers 24 may have multiple print position widths. In that case, print hammers 24 cannot be repeat fired until a certain settle time has transpired. Thus, in the determination of the earliest belt position and print scan after Start Scan $S_I$, it is possible that a particular print hammer for the designated print position cannot be operated because of the settle time constraint. The time constraint is not met where there is a previous scan indicated in the scan/subscan table for the print hammer position and the difference between the previous and instant scans is less than the value H for that print position. In that event, the next earliest belt position is selected from the occurrence table and a corresponding next scan is determined. The value H depends on whether a right or left print position of any given hammer is to occur first and whether $Scan_{Right}$ or $Scan_{Left}$ is the higher value. In the table of FIG. 6, $H_1$ is selected if $Scan_{Right} - Scan_{Left}$ is $\geq H_1$. If $Scan_{Left}$ is the higher value, $Scan_{Left} - Scan_{Right} \geq H_2$ is the value selected. H values shown in FIG. 6 may be stored in a suitable location in ROS of a microprocessor 15 or other suitable means.

In this way printing control is greatly simplified. Real time character code comparisons are avoided. Data processing is performed during print medium indexing and printing can begin immediately thereafter. Microprocessor 15 may be any general purpose digital device which can readily be programmed to perform the simple processes described. Because microprocessors operate in relatively short time periods, the processing of a line of data as described is readily achieved during print medium indexing. The use of an occurrence table greatly reduces processing compared to the prior procedure of doing real time comparisons between direct belt images and character generators operating in synchronism with the belt motion. Indirect addressing eliminates the need of sorting scan values to obtain a scan/subscan order of print positions.

We claim:

1. A printer system comprising in combination
a printer mechanism including
   a continuous moving type element having plural uniformly spaced characters arranged in a row,
   said characters occurring at various locations and frequencies on said type element,
   a plurality of uniformly spaced print units arranged in a row parallel with said row of characters and co-acting therewith to define a print line,
   said print units and said characters having different pitches whereby the relative motion between type element and said print units causes sequential scan and subscan alignments of said characters and said print units;
indexing means for advancing a print medium in controllable increments relative to said print line; and
control means for selectively operating said print units for printing selected characters during motion of said type element at selected print positions of a print line including
   means for supplying print data signals representative of the selected characters and print positions for a line of data to be printed at an indexable position of said print medium,
   means for supplying a start scan data signal specifying the start print scan occurring at completion of print medium advance to a selected line index position,
   storage means containing character occurrence data representative of the number of occurrences and specifying the type element positions of said characters on said type element,
   said type element positions of said characters being in terms of the number of print scans said characters are displaced relative to a reference position on said type element,
   processor means operable during print medium advance to a selected line index position for
     1. examining said print data signals for each print position of said line of data for each selected character to be printed thereat,
     2. determining from said character occurrence data in said storage means and said start scan data signal the earliest type element position after start scan for each selected character in said line of data, and then,
     3. determining the earliest print scan following start scan during
     which the earliest type element position for each selected character and the desired print position will align,
   means controllable by said processor means for selectively operating said print units in accordance with the order of the print scans as determined by said processor means commencing with said start print scan and including scan storage mean containing in a scan order arrangement said print scan data determined for said selected characters by said processor means.

2. A printer system in accordance with claim 1 in which said scan storage means includes
- a scan/subscan table having storage locations for each scan/subscan in a complete revolution of said type element,
- a print position fire table having addressable storage locations for storing print position data representing those print units to be fired for any scan/subscan position of said type element,
- said scan/subscan table having indirect address information stored in said scan/subscan storage locations for addressing corresponding print position fire table storage locations containing print position fire data for related scan/subscan positions of said type element.

3. A printer system in accordance with claim 2 in which
said continuous type element is a flexible type belt having characters and timing elements thereon;
said means for supplying print data signals in a print line buffer containing selected character and print position codes for various characters to be printed at various print positions of a print line;
said storage means is a memory device for storing said character occurrence data in occurrence tables,
said character occurrence data in said occurrence tables comprises character code of each distinct character on said type belt, numerical code representing the number of occurrences for each character identified by said character code, and belt position code representing the number of scans each occurrence of the character designated by said character code is displaced from a reference position on said type belt; and
said processor means is a microprocessor operable during said print medium advance for
1. determining for each said character code and print position code in said print line buffer the earliest type belt position code at or after start scan in said occurrence tables, then
2. computing the print scan when said earliest type belt position of a selected character will align with said print position designated by said print position code, and thereafter
3. storing
    indirect address information at the scan/subscan storage location of said scan/subscan table corresponding with said computed print scans, and
    the print position codes from said print line buffer for the selected character at said indirect address locations of said print position fire table.

4. A printer system in accordance with claim 3 in which
said microprocessor
1. stores a fire count for each indirect address location,
2. alters said fire count to correspond with the number of print positions having fire code stored at said indirect address of said print position fire table, and
3. determines whether said fire count at said indirect address location equals a maximum count representing a predetermined plurality of print positions alignable with characters on said type belt during a particular subscan, and
4. redetermines the next earliest belt position and available print scan in the event said maximum count is equalled.

5. A printer system in accordancce with claim 2 in which
said processor means is further operable for assigning indirect addresses for storage in said scan/subscan table,
said indirect addresses being assigned sequentially for each first time a location in said scan/subscan table is addressed.

6. A printer system in accordance with claim 5 in which
said print position fire table includes a count storage location for each indirect address location containing fire count information specifying the number of print positions having firing data at said indirect addresses of said fire table.

7. A printer system in accordance with claim 6 in which
said processor means is further operable for incrementing said fire count information for each print position fire information stored at said indirect address of said print position fire table.

8. A printer system in accordance with claim 7 in which
said processor means is operable to determine whether said fire count information at an indirect address location in said print position fire table equals a maximum count,
said maximum count representing a predetermined plurality of said print units alignable with characters during a subscan, and
said processor means being further operable in the event said maximum count is equalled to further determine from said storage means the next earliest type element position subsequent to scan start and the print scan therefor for storage in another available scan/subscan storage location of said scan/subscan table corresponding with said further determined print scan.

9. A printer system in accordance with claim 7 which further comprises
a print scan signal generator operable in synchronism with said type element motion for providing print scan signals representing print scan alignment occurrences of said type element and print units, and
means associated with said processor means for addressing said scan/subscan table in response to said print scan signals beginning with the start print scan storage location of said table and progressing sequentially thereafter in scan/subscan order.

10. A printer system in accordance with claim 9 which further comprises
means associated with said processor means for
    determining the occurrence of an identity of said print scan signals provided by said print scan signal generator with said start print scan, and in response to occurrence of said identity,
    causing addressing to begin with the designated start print scan storage location of said scan/subscan table.

11. A printer system in accordance with claim 1 in which
said storage means containing occurrence data signals comprises
    a memory device for storing occurrence tables for the characters on said type element.

12. A printer system in accordance with claim 11 in which
said memory device is a RAM memory having an occurrence table for each unique character on said type element.

13. A printer system in accordance with claim 12 in which
said occurrence tables in said RAM memory are electrically alternable for corresponding changes either in characters, number of occurrences, or arrangement thereof on said type element.

14. A printer system in accordance with claim 12 in which
said character occurrence tables are addressable by said processor means in response to the examination of selected characters for the various print positions of a line of data to be printed.

15. A printer system in accordance with claim 3 in which
said occurrence tables comprise a character code representing a unique character on said type element, a numerical value code representing the number of occurrences for the character specified by said character code, and one or more distinct position codes equal to said number of occurrences, said position codes comprising numerical values specifying the scans each occurrence of a character is displaced from a home character position on said type element.

16. A printer system in accordance with claim 15 in which
the determination by said processor means of said earliest type element position after start scan for a selected character includes said processor means performing
a calculation according to the expression $$B = S_I + A_X,$$

where $S_I$ equals the start scan numerical value designating the time allowed for the print medium advance $A_X$ is the adjust numerical value defining the scan at which any given type element position aligns with the desired print position relative to a first print position, and comparing said position codes in said occurrence tables for said selected character for a position code value equal to or greater than $B_I$.

17. A printer system in accordance with claim 16 in which
the determination by said processor means of the earliest print scan S following start scan $S_I$ during which the earliest type element position after start scan for a selected character and the desired print position will align includes said processor means performing a further calculation according to the expression $S = B - A_X$.

18. A printer system in accordance with claim 15 in which said print units are multiple width print units, and
the determination by said processor means of said earliest type element position at or after start scan and the corresponding print scan for a selected character includes said processor means determining whether multiple operations of any given print unit in different subscans will occur within a designated settle time interval for the given print unit, and in such event determining the next earliest type element position and a corresponding print scan in which multiple operations of the given print unit will not occur within said designated settle time interval.

19. A printer system in accordance with claim 18 in which
said print units are two wide print position print units.

20. A printer system in accordance with claim 1 in which
said start scan data signal is a numerical value representing the equivalent number of scans occurring in the time allowed for advancing said print medium to a desired index line position for printing said selected characters.

* * * * *